United States Patent
Li et al.

(10) Patent No.: US 11,175,528 B2
(45) Date of Patent: Nov. 16, 2021

(54) COLOR FILTER SUBSTRATE, DISPLAY PANEL, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yanfeng Li, Beijing (CN); Yanan Yu, Beijing (CN); Yanqing Chen, Beijing (CN); Wei Li, Beijing (CN)

(73) Assignees: ORDOS YUANSHENG OPTOELECTRONICS CO., LTD., Ordos (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/620,217

(22) PCT Filed: Apr. 25, 2018

(86) PCT No.: PCT/CN2018/084453
§ 371 (c)(1),
(2) Date: Dec. 6, 2019

(87) PCT Pub. No.: WO2018/223788
PCT Pub. Date: Dec. 13, 2018

(65) Prior Publication Data
US 2020/0142250 A1 May 7, 2020

(30) Foreign Application Priority Data
Jun. 7, 2017 (CN) .......................... 201710421646

(51) Int. Cl.
*G02F 1/1335* (2006.01)
*G02F 1/1343* (2006.01)
*G02F 1/1333* (2006.01)

(52) U.S. Cl.
CPC .. *G02F 1/133514* (2013.01); *G02F 1/133512* (2013.01); *G02F 1/134309* (2013.01);
(Continued)

(58) Field of Classification Search
CPC ......... G02F 1/133514; G02F 1/133707; G02F 1/133753; G02F 1/134309; G02F 1/1393;
(Continued)

(56) References Cited

U.S. PATENT DOCUMENTS 8,860,669 B2* 10/2014 Kim ........................ G06F 3/044
178/18.01
2005/0122446 A1* 6/2005 Jeon .................. G02F 1/133512
349/110
(Continued)

FOREIGN PATENT DOCUMENTS

CN 102629018 A 8/2012
CN 103018980 A 4/2013
(Continued)

OTHER PUBLICATIONS

International Search Report and Written Opinion issued in corresponding International Application No. PCT/CN2018/084453, dated Jul. 16, 2018, with English language translation.
(Continued)

*Primary Examiner* — Hoan C Nguyen
(74) *Attorney, Agent, or Firm* — McDermott Will and Emery LLP (57) ABSTRACT

A color filter substrate, a display panel and a display device are provided. The color filter substrate includes a common electrode layer and an upper transparent substrate disposed over the common electrode layer. The common electrode layer is provided with a plurality of slits, and orthographic projections of the slits on the upper glass substrate are within an opaque region of the color filter substrate. Orthographic
(Continued)

projections of slits in two adjacent rows on the upper transparent substrate are separated by at least two rows of sub-pixel units; or orthographic projections of slits in two adjacent columns on the upper transparent substrate are separated by at least two columns of sub-pixel units.

5 Claims, 8 Drawing Sheets

(52) U.S. Cl.
CPC .. *G02F 1/133357* (2021.01); *G02F 1/134345* (2021.01); *G02F 2201/121* (2013.01)

(58) Field of Classification Search
CPC ......... G02F 1/133512; G02F 1/133357; G02F 1/134345; G02F 2201/121; G02F 2001/134345; G02F 2001/133357
See application file for complete search history.

(56) References Cited

U.S. PATENT DOCUMENTS

| | | | | |
|---|---|---|---|---|
| 2013/0010244 A1* | 1/2013 | Suwa | .................... | C09K 19/56 349/123 |
| 2014/0071553 A1 | 3/2014 | Park | | |
| 2014/0267955 A1* | 9/2014 | Hibayashi | ........... | G02F 1/13338 349/12 |
| 2015/0338708 A1 | 11/2015 | Li et al. | | |
| 2017/0090244 A1 | 3/2017 | Jiang et al. | | |
| 2017/0153480 A1* | 6/2017 | Lv | .................... | G02F 1/134309 |
| 2017/0153481 A1* | 6/2017 | Wang | .................. | G02F 1/13394 |
| 2017/0192580 A1* | 7/2017 | Jung | .................. | G02F 1/134363 |
| 2017/0278903 A1* | 9/2017 | Zhou | .................... | H01L 27/3211 |
| 2020/0142250 A1 | 5/2020 | Li et al. | | |

FOREIGN PATENT DOCUMENTS

| | | |
|---|---|---|
| CN | 101963712 B | 7/2013 |
| CN | 203311137 U | 11/2013 |
| CN | 103676357 A | 3/2014 |
| CN | 105892175 A | 8/2016 |
| CN | 106980203 A | 7/2017 |

OTHER PUBLICATIONS

First Office Action issued in Chinese Application No. 201710421646.0, dated Sep. 10, 2018, with English language translation.

* cited by examiner

COLOR FILTER SUBSTRATE, DISPLAY PANEL, AND DISPLAY DEVICE

CROSS-REFERENCE TO RELATED APPLICATION

This application is a national phase entry under 35 USC 371 of International Patent Application No. PCT/CN2018/084453 filed on Apr. 25, 2018, which claims priority to Chinese Patent Application No. 201710421646.0, filed with SIPO on Jun. 7, 2017, titled "COLOR FILTER SUBSTRATE, DISPLAY PANEL AND DISPLAY DEVICE", which are incorporated herein by reference in their entirety.

TECHNICAL FIELD

Embodiments of the present disclosure relate to a color filter substrate, a display panel and a display device.

BACKGROUND

A patterned vertical alignment (PVA) liquid crystal display has a multi-domain display effect. That is, liquid crystal molecules have two rotation directions, which may avoid problems such as a color cast and an asymmetrical viewing angle of a single-domain liquid crystal display (that is, the liquid crystal molecules have only one rotation direction).

SUMMARY

At least one embodiment of the present disclosure provides a color filter substrate. The color filter substrate includes a common electrode layer and an upper transparent substrate disposed over the common electrode layer. The common electrode layer is provided with a plurality of slits. Orthographic projections of the slits on the upper transparent substrate are within an opaque region of the color filter substrate, and orthographic projections of slits in two adjacent rows on the upper transparent substrate are separated by at least two rows of sub-pixel units. Or, orthographic projections of slits in two adjacent columns on the upper transparent substrate are separated by at least two columns of sub-pixel units.

or example, the orthographic projections of the slits on the upper transparent substrate each are in a shape of a rectangle.

For example, a long side of each slit is parallel to a side of a corresponding sub-pixel unit in a row direction, or a long side of each slit is parallel to a side of a corresponding sub-pixel unit in a column direction.

For example, the orthographic projections of the slits in two adjacent rows on the upper transparent substrate are separated by at least two rows of sub-pixel units, a number of slits in each row is the same as a number of sub-pixel units in a row, and slits in each column are in a same column as sub-pixel units in a corresponding column.

For example, the orthographic projections of the slits in two adjacent columns on the upper transparent substrate are separated by at least two columns of sub-pixel units, a number of slits in each column is the same as a number of sub-pixel units in a column, and slits in each row are in a same row as sub-pixel units in a corresponding row.

For example, a length of a long side of each slit is equal to a width of a corresponding sub-pixel unit in a row direction.

For example, a length of a long side of each slit is equal to a width of a corresponding sub-pixel unit in a column direction.

For example, the color filter substrate further includes a planarization layer disposed over the common electrode layer, and a black matrix and a color filter layer disposed over the planarization layer. The upper transparent substrate is disposed over the black matrix and the color filter layer. The orthographic projections of the slits on the upper transparent substrate are within an orthographic projection of the black matrix on the upper transparent substrate.

For example, an extending direction of a long side of each slit is perpendicular to an extending direction of the sub-pixel units, and in the extending direction of the sub-pixel units, each column of sub-pixel units have a same color.

At least one embodiment of the present disclosure provides a display panel. The display panel includes the color filter substrate according to the embodiments of the present disclosure.

For example, the display panel according to the embodiments of the present disclosure further includes an array substrate disposed opposite to the color filter substrate.

For example, the display panel according to the embodiments of the present disclosure further includes a liquid crystal layer disposed between the color filter substrate and the array substrate.

At least one embodiment of the present disclosure provides a display device. The display device includes the display panel according to the embodiments of the present disclosure.

For example, an extending direction of a long side of each slit is perpendicular to an extending direction of the sub-pixel units, and in the extending direction of the sub-pixel units, each row of sub-pixel units have a same color.

For example, a silt of the plurality of slits is located over a gap between corresponding two adjacent pixel electrodes.

For example, a size of the slit is greater than a size of the gap between the corresponding two adjacent pixel electrodes.

For example, the opaque region of the color filter substrate is within the orthographic projections of the black matrix on the upper transparent substrate.

BRIEF DESCRIPTION OF THE DRAWINGS

Embodiments of the present disclosure will be described in more detail below in combination with the accompanying drawings, so that a person of ordinary skill in the art may understand the embodiments of the present disclosure more clearly.

DETAILED DESCRIPTION

The technical solutions in embodiments of the present disclosure will be described clearly and completely in combination with the accompanying drawings in the embodiments of the present disclosure. Obviously, the described embodiments are merely some but not all of the embodiments of the present disclosure. On the basis of the embodiments of the present disclosure, all other embodiments obtained by a person of ordinary skill in the art without paying any creative effort shall be included in the protection scope of the present disclosure.

Embodiments of the present disclosure provide a color filter substrate, a display panel and a display device, so as to prevent domain lines from appearing in a light transmitting region of a display product, and improve a transmittance of the display product and a display quality of the display product.

Figure 1:
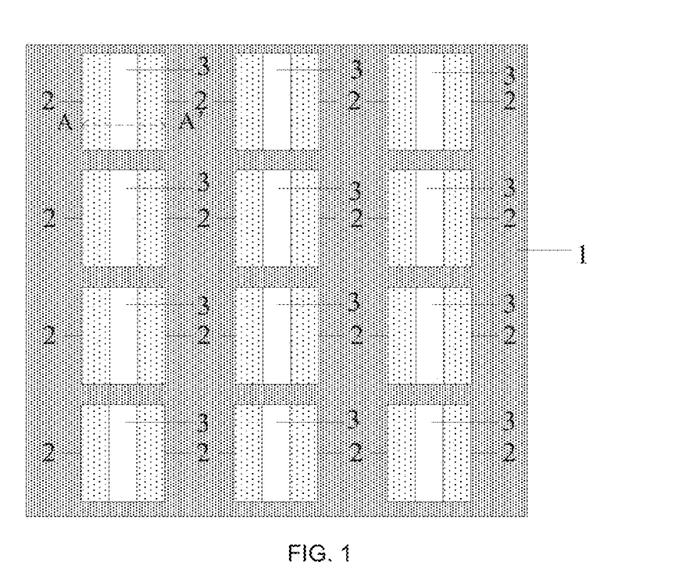
FIG. 1 is a schematic diagram of a patterned vertical alignment (PVA) liquid crystal display panel in which pixel electrodes are provided with slits.
Figure 2:
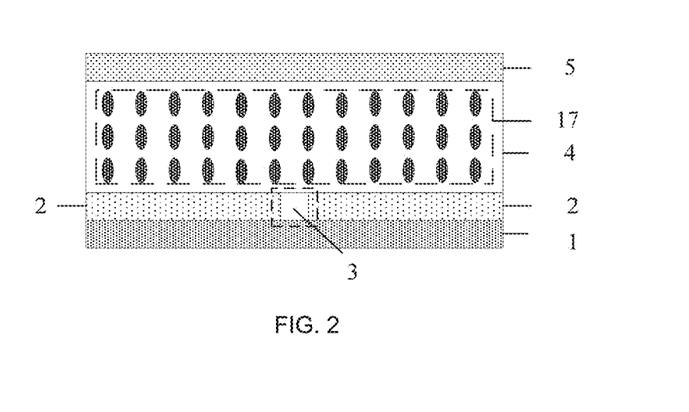
FIG. 2 is a schematic diagram showing an arrangement of liquid crystal molecules in a case where a PVA liquid crystal display panel is in a dark state.
Figure 3:
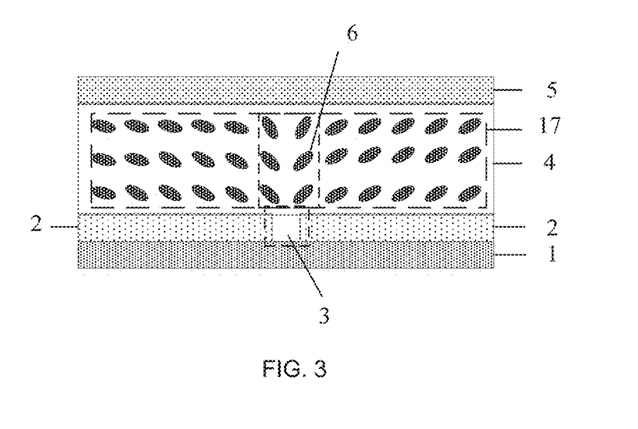
FIG. 3 is a schematic diagram showing an arrangement of liquid crystal molecules in a case where a PVA liquid crystal display panel is in a bright state.
Figure 4:
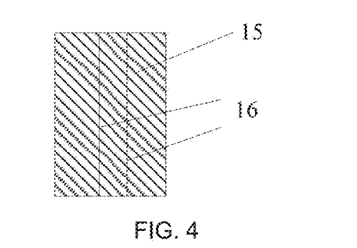
FIG. 4 is a schematic diagram showing domain lines that appear in a case where a PVA liquid crystal display panel is in a bright state.

In a patterned vertical alignment (PVA) liquid crystal display panel, an arrangement of pixel electrodes 2 on a base substrate 1 is as shown in FIG. 1 (other structures of the display panel are not shown). A slit 3 is provided in a pixel electrode 2, a long side of the slit 3 is parallel to an extending direction of a data line Data, and a position of the slit 3 corresponds to a light transmitting region. That is, each slit divides a corresponding pixel electrode into two parts. FIGS. 2 and 3 are cross-sectional diagrams of the PVA liquid crystal display panel taken along line AA'. As shown in the figures, the display panel includes the base substrate 1, the pixel electrodes 2, a liquid crystal layer 4 and a common electrode layer 5. The liquid crystal layer 4 includes liquid crystal molecules 17. As shown in FIG. 2, in a dark state (in a case where no voltages are applied to the pixel electrodes and the common electrode layer), the liquid crystal molecules are arranged perpendicular to the pixel electrodes 2, and the display panel is in a black state at a macro level by means of a polarizer (not shown). As shown in FIG. 3, after voltages are applied to the pixel electrodes 2 and the common electrode layer 5, the liquid crystal molecules rotate under control of the pixel electrodes 2 and the common electrode layer 5. In a sub-pixel unit, the liquid crystal molecules have two rotation directions, thereby achieving a multi-domain display effect of a liquid crystal display. However, as shown in FIG. 3, due to an uneven distribution of an electric field or an asymmetric part of the electric field in a region 6 corresponding to the slit in the pixel electrode, liquid crystal molecules in the region 6 corresponding to the slit in the pixel electrode are disorderly arranged. At a macro level, as shown in FIG. 4, as for each sub-pixel unit, dark lines (i.e., domain lines 16) appear in a region corresponding to the slit in a light transmitting region 15 of the sub-pixel unit, which may affect a transmittance of the display panel and a quality of an image displayed by the display panel.

The transmittance of the display product is a ratio of light, which will enters human eyes, exiting from the display product during display to light emitted by a backlight of the display product.

Figure 5:
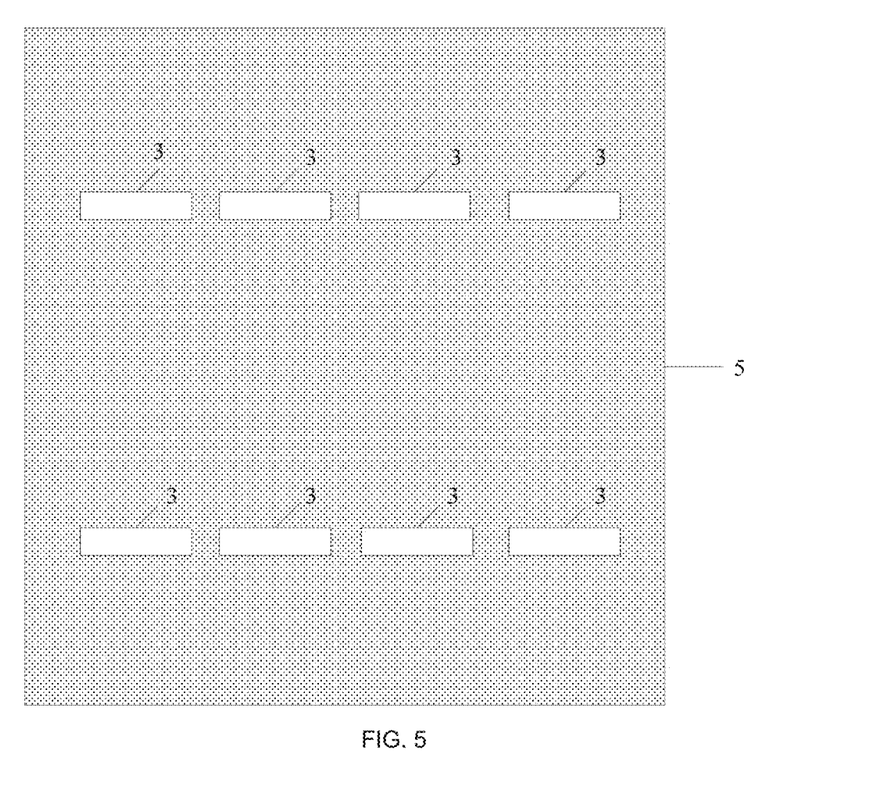
FIG. 5 is a schematic diagram showing a first structure of a color filter substrate, according to embodiments of the present disclosure.
Figure 6:
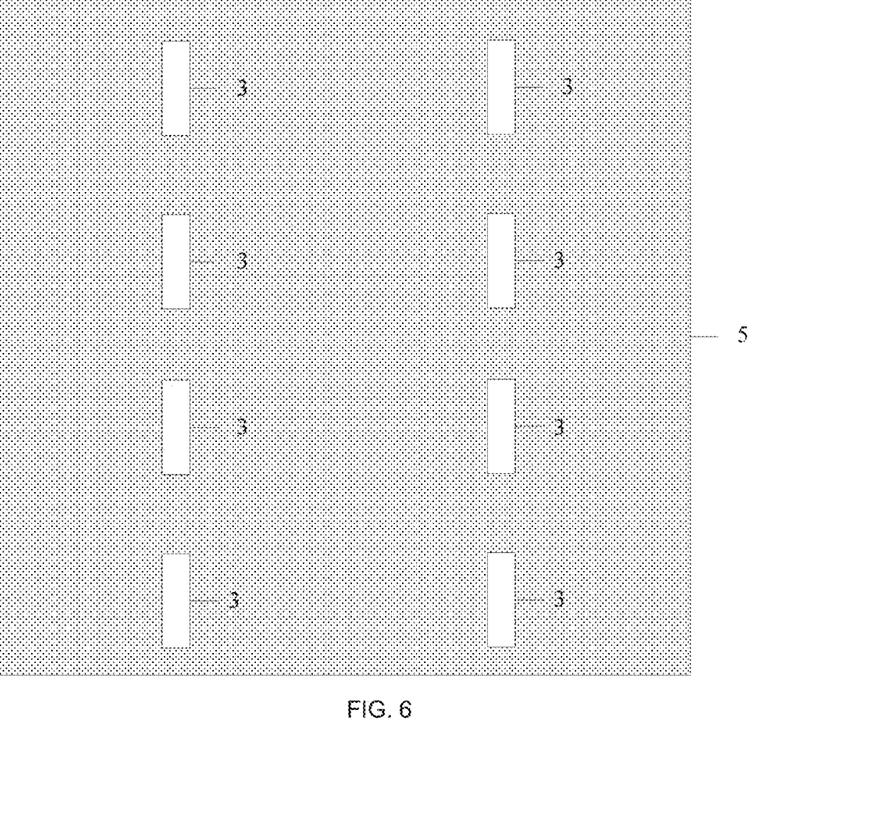
FIG. 6 is a schematic diagram showing a second structure of a color filter substrate, according to embodiments of the present disclosure.
Figure 7:
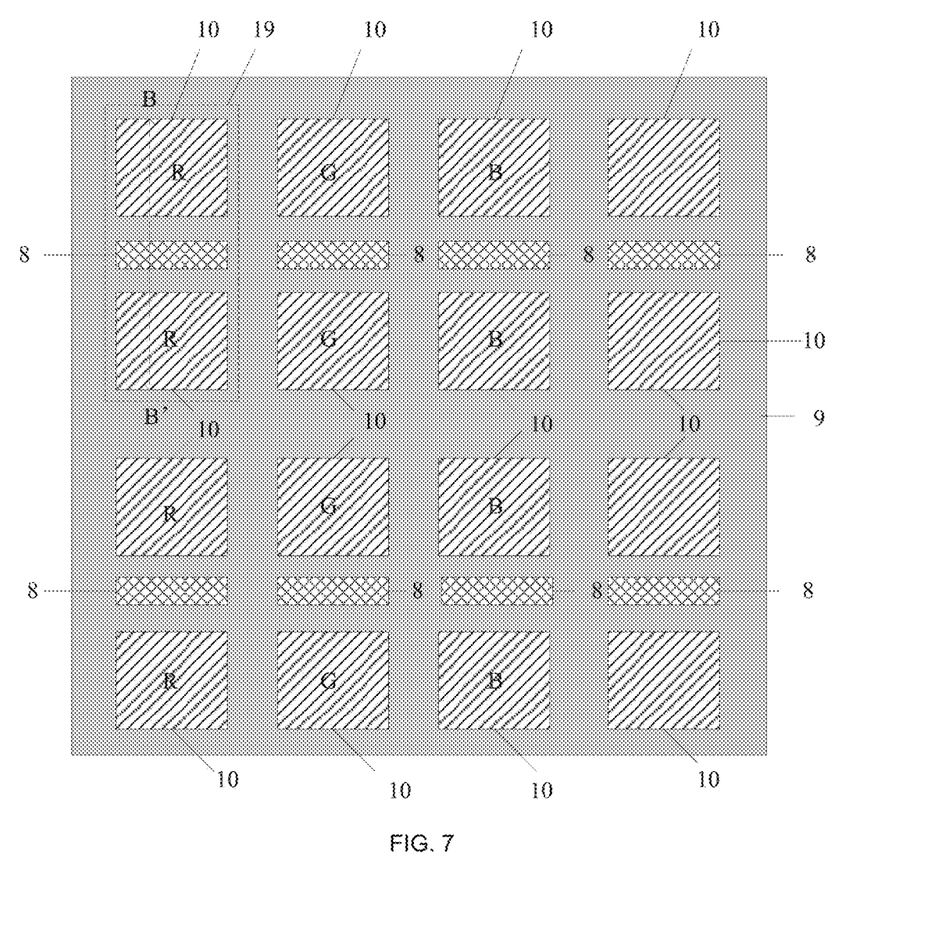
FIG. 7 is a schematic diagram showing an arrangement manner of slits in a common electrode layer, according to embodiments of the present disclosure.
Figure 8:
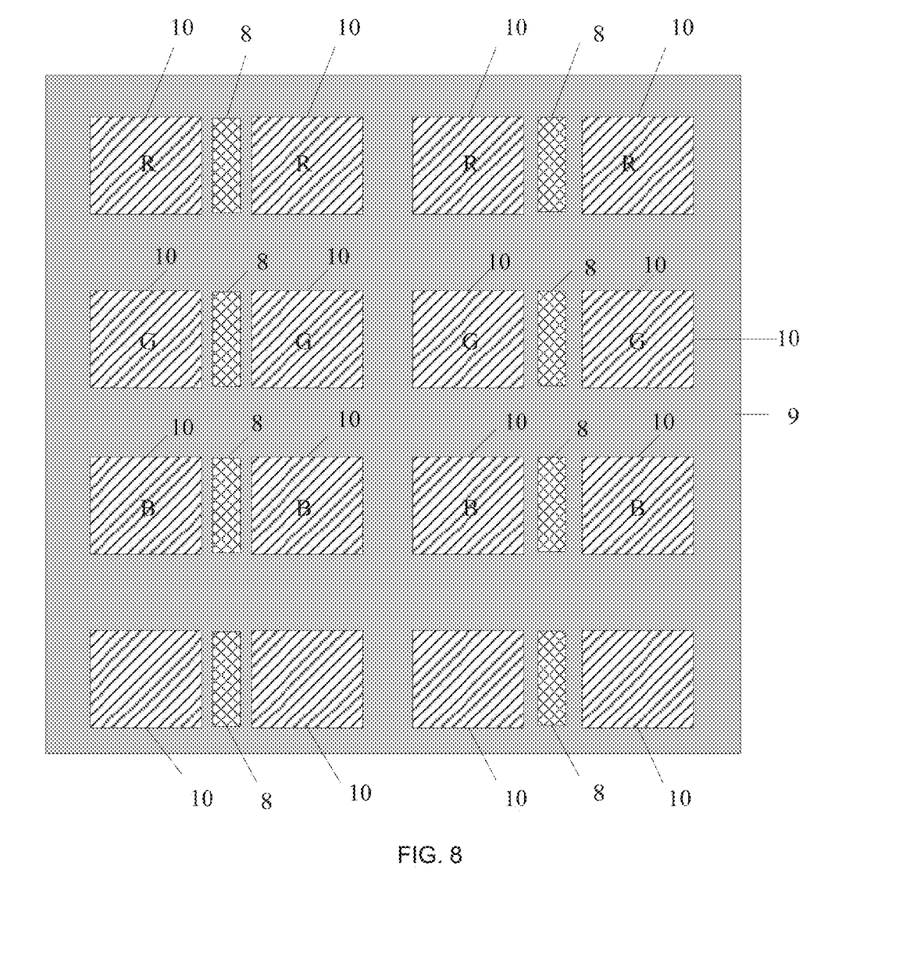
FIG. 8 is a schematic diagram showing another arrangement manner of slits in a common electrode layer, according to embodiments of the present disclosure.

An embodiment of the present disclosure provides a color filter substrate, and as shown in FIGS. 5 and 6, the color filter substrate includes a common electrode layer 5, and the common electrode layer 5 is provided with a plurality of slits 3. As shown in FIGS. 7 and 8, orthographic projections 8 of the slits 3 in FIGS. 5 and 6 on an array substrate opposite to the color filter substrate are within an opaque region 9 of the array substrate. Moreover, as for the array substrate, orthographic projections 8 of the slits 3 in two adjacent rows in FIG. 5 on the array substrate are separated by at least two rows of sub-pixel units 10. Or, as shown in FIG. 8, orthographic projections 8 of the slits 3 in two adjacent columns in FIG. 6 on the array substrate are separated by at least two columns of sub-pixel units 10. However, the embodiments of the present disclosure are not limited thereto.

In the color filter substrate provided by the embodiments of the present disclosure, the common electrode layer is provided with the slits. In a case where the color filter substrate provided by the embodiments of the present disclosure is applied to a liquid crystal display panel, after voltages are applied to the pixel electrodes and the common electrode layer that are capable of controlling rotation of the liquid crystal molecules, an electric field that is generated between a pixel electrode and the common electrode layer has at least two directions. Therefore, the rotation directions of the liquid crystal molecules also include at least two directions, and a multi-domain display of the liquid crystal display panel may be achieved. Since the orthographic projections of the slits on the array substrate are within the opaque region, and the slits in two adjacent rows or the slits in two adjacent columns are separated by the sub-pixel units, regions corresponding to liquid crystal molecules that are disorderly arranged are only in the opaque region. At a macro level, since the domain lines caused by a disordered arrangement of the liquid crystal molecules appear in the opaque region, the domain lines may be prevented from appearing in the light transmitting region, the transmittance of the product may be improved, and the quality of the image displayed by the product may be improved.

It will be noted that, the arrangement manners of the slits shown in FIGS. 7 and 8 are described by taking an example in which the orthographic projections 8 of the slits in two adjacent rows on the array substrate are separated by two rows of sub-pixel units 10, or the orthographic projections 8 of the slits in two adjacent columns on the array substrate are separated by two columns of sub-pixel units 10. By using the arrangement manner of the slits, a color displayed by a sub-pixel unit using a multi-domain display manner is more uniform and the multi-domain display effect is better. However, the embodiments of the present disclosure are not limited thereto. For example, the orthographic projections 8 of the slits in two adjacent rows on the array substrate may be separated by three rows of sub-pixel units, four rows of sub-pixel units or even more rows of sub-pixel units. The orthographic projections 8 of the slits in two adjacent columns on the array substrate may be separated by three columns of sub-pixel units, four columns of sub-pixel units or even more columns of sub-pixel units. In this way, the multi-domain display may be achieved, and the domain lines may be prevented from appearing in the light transmitting region. The number of rows of sub-pixel units or the number of columns of sub-pixel units between the orthographic projections of two adjacent rows of the slits or two adjacent columns of the slits on the array substrate may be selected according to actual needs.

For example, the orthographic projection of the slit on the array substrate is in a shape of a rectangle. As shown in FIGS. 7 and 8, the orthographic projections 8 of the slits on the array substrate are all in the shape of a rectangle. However, the embodiments of the present disclosure are not limited thereto. For example, the slits may be configured to have other shapes, as long as the multi-domain display may be achieved and the domain lines are prevented from appearing in the light transmitting region.

For example, as shown in FIG. 7, a long side of the rectangle is parallel to gate lines of the array substrate. Or, a long side of the rectangle is parallel to data lines of the array substrate.

It will be noted that, the gate lines and the data lines are crosswise arranged to divide the array substrate into a plurality of sub-pixel units. In a direction perpendicular to the array substrate, positions of the gate lines and positions of the data lines correspond to the opaque region. For example, an area of an opaque region corresponding to the gate lines is greater than an area of an opaque region corresponding to the data lines. If the long side of the rectangle is parallel to the gate lines, the slits are disposed in the opaque region corresponding to the gate lines. If the long side of the rectangle is parallel to the data lines, the slits are disposed in the opaque region corresponding to the data lines. Therefore, compared with a situation in which the long side of the rectangle is parallel to the data lines, that the long side of the rectangle is parallel to the gate lines has fewer limitations on a size of the slit. Correspondingly, a process of forming the slits is less difficult and is easier to be implemented. For example, positions of the slits may be determined according to a requirement of the sizes of the slits and the process of forming the slits.

For example, as shown in FIG. 7, in a case where the orthographic projections of the slits in two adjacent rows on the array substrate are separated by at least two rows of sub-pixel units, the number of slits in each row is the same as the number of sub-pixel units in a row, and slits in each column are in a same column as sub-pixel units in a column.

As shown in FIG. 8, in a case where the orthographic projections of the slits in two adjacent columns on the array substrate are separated by at least two columns of sub-pixel units, the number of slits in each column is the same as the number of sub-pixel units in a column, and slits in each row are in a same row as sub-pixel units in a row.

In this way, in the case where the color filter substrate provided by the embodiments of the present disclosure is applied to the display panel, as for sub-pixel units in a same row or sub-pixel units in a same column, rotation directions of the liquid crystal molecules are consistent. Therefore, the color of a displayed image is uniform, and the quality of the displayed image is further improved.

For example, as shown in FIG. 7, in the case where the orthographic projections of the slits in two adjacent rows on the array substrate are separated by at least two rows of sub-pixel units, a length of a long side of each slit is equal to a width of a corresponding sub-pixel unit in a row direction.

As shown in FIG. 8, in the case where the orthographic projections of the slits in two adjacent columns on the array substrate are separated by at least two columns of sub-pixel units, a length of a long side of each slit is equal to a width of a corresponding sub-pixel unit in a column direction.

In this way, the common electrode layer is still one electrode block. That is, the common electrode layer is not divided into a plurality of separate parts by the slits. Therefore, an arrangement manner of common electrode leads is similar to a conventional arrangement manner of common electrode leads. That is, by using the color filter substrate, the multi-domain display effect may be achieved and the transmittance of the display panel and the quality of the displayed image may be improved synchronously, without changing the arrangement manner of the common electrode leads in the conventional technology. In addition, a manufacturing process of the color filter substrate designed as above is simple and is easy to be implemented.

Figure 9:
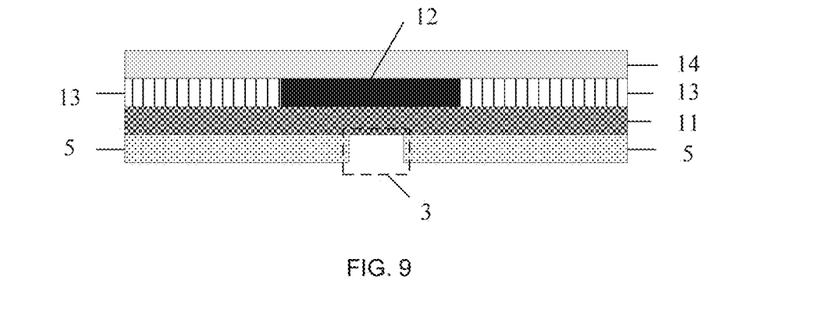
FIG. 9 is a schematic diagram showing a third structure of a color filter substrate, according to embodiments of the present disclosure.

For example, as shown in FIG. 9, the color filter substrate further includes a planarization layer 11 disposed over the common electrode layer 5, a black matrix 12 and a color filter layer 13 disposed over the planarization layer 11, and an upper transparent substrate 14 disposed over the black matrix 12 and the color filter layer 13. The orthographic projections of the slits on the array substrate are within an orthographic projection of the black matrix on the array substrate. That is, the slits 3 disposed in the common electrode layer are located below the black matrix 12. The transparent substrate 14 may be, for example, a glass substrate, a plastic substrate or a quartz substrate. In the case where the color filter substrate shown in FIG. 9 provided by the embodiments of the present disclosure is applied to the liquid crystal display panel, since the slits are disposed below the black matrix, and the black matrix corresponds to the opaque region. Thereby, positions of the domain lines corresponding to the slits are blocked by the black matrix, and a display effect of the image may not be affected and the multi-domain display may be achieved synchronously. In this way, the transmittance of the product and the quality of the displayed image may be improved.

The display panel provided by embodiments of the present disclosure includes the color filter substrate provided by the embodiments of the present disclosure.

The display panel provided by the embodiments of the present disclosure may be, for example, a liquid crystal display panel. In the display panel provided by the embodiments of the present disclosure, since the common electrode layer of the color filter substrate is provided with the slits, the orthographic projections of the slits on the array substrate are within the opaque region, and the slits in two adjacent rows or the slits in two adjacent columns are separated by the sub-pixel units. Thereby, the domain lines may be prevented from appearing in the light transmitting region of the display panel and the multi-domain display effect may be achieved synchronously. Further, the transmittance of the display panel and a display quality of the display panel may be improved.

For example, the display panel provided by the embodiments of the present disclosure further includes an array substrate disposed opposite to the color filter substrate.

The array substrate includes, for example, pixel electrodes. In the display panel provided by the embodiments of the present disclosure, since the slits are disposed in the common electrode layer, the multi-domain display effect may be achieved without providing a slit on a pixel electrode to divide the pixel electrode into two parts. Moreover, an arrangement manner of the display panel provided by the embodiments of the present disclosure that realizes the multi-domain display effect may prevent the domain lines from appearing in the light transmitting region. Thereby, the transmittance of the display panel may not be reduced and the quality of the image displayed by the display panel may not be affected.

For example, the display panel provided by the embodiments of the present disclosure further includes a liquid crystal layer disposed between the color filter substrate and the array substrate.

Figure 10:
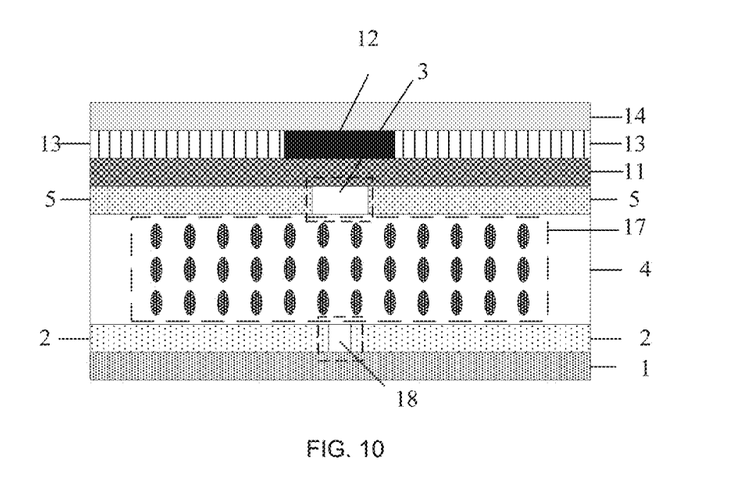
FIG. 10 is a schematic diagram showing an arrangement of liquid crystal molecules in a case where a display panel is in a dark state, according to embodiments of the present disclosure.
Figure 11:
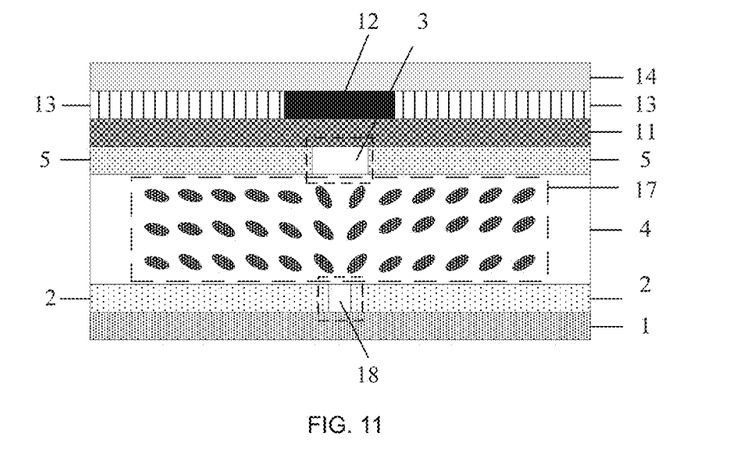
FIG. 11 is a schematic diagram showing an arrangement of liquid crystal molecules in a case where a display panel is in a bright state, according to embodiments of the present disclosure.
Figure 12:
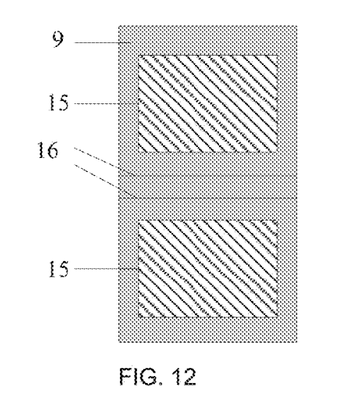
FIG. 12 is a schematic diagram showing positions of domain lines of a display panel, according to embodiments of the present disclosure.

The display panel provided by the embodiments of the present disclosure is described by taking the arrangement manner of the slits in the common electrode layer shown in FIG. 7 as an example. A cross-sectional structure of the display panel taken along line BB' in FIG. 7 is shown in FIGS. 10 and 11. The display panel includes a color filter substrate, an array substrate, and a liquid crystal layer 4 disposed between the color filter substrate and the array substrate. The color filter substrate includes: a common electrode layer 5 provided with slits 3, a planarization layer 11 disposed over the common electrode layer 5, a black matrix 12 and a color filter layer 13 disposed over the planarization layer 11, and an upper transparent substrate 14 disposed over the black matrix 12 and the color filter layer 13. The array substrate includes a base substrate 1 and pixel electrodes 2 disposed over the base substrate 1. There is a gap 18 between two adjacent pixel electrodes 2. The liquid crystal layer 4 includes liquid crystal molecules 17. The transparent substrate 14 may be, for example, a glass substrate, a plastic substrate or a quartz substrate. FIG. 10 is a schematic diagram showing an arrangement of the liquid crystal molecules in a case where the display panel is in the dark state. In a case where the display panel provided by the embodiments of the present disclosure is in the dark state, the liquid crystal molecules are arranged perpendicular to the array substrate, which is the same as a conventional PVA liquid crystal display panel. FIG. 11 is a schematic diagram showing an arrangement of the liquid crystal molecules in a case where the display panel is in a bright state. Due to a presence of the slits 3, the electric field has at least two directions. Therefore, in the region 19 shown in FIG. 7, rotation directions of liquid crystal molecules corresponding to an upper sub-pixel unit are different from rotation directions of liquid crystal molecules corresponding to a lower sub-pixel unit, and the multi-domain display may be achieved. Moreover, a region in which the liquid crystal molecules are disorderly arranged is between the upper sub-pixel unit and the lower sub-pixel unit. At a macro level, as shown in FIG. 12, as for the sub-pixel units corresponding to the region 19 in FIG. 7, the domain lines 16 appear in the opaque region 9, and the light transmitting region 15 may not be affected. The display panel provided by the embodiments of the present disclosure has a higher transmittance and the quality of the image displayed by the display panel is better.

For example, as shown in FIGS. 7 and 8, a direction in which the orthographic projections 8 of slits 3 on the array substrate extends on the array substrate is perpendicular to an extending direction of the sub-pixel units. In the extending direction of the sub-pixel units, each column of sub-pixel units (such as R, G, or B) have a same color; or in the extending direction of the sub-pixel units, each row of sub-pixel units (such as R, G, or B) have a same color, thereby achieving a multi-domain display of an image of a single color.

It will be noted that, in FIGS. 10 and 11, a slit in the common electrode layer is located directly above a gap between two adjacent pixel electrodes. Since the gap between the two adjacent pixel electrodes is very small, and a size of the slit in the common electrode layer is greater than a size of the gap between the pixel electrodes, after voltages are applied to the pixel electrodes and the common electrode layer, the electric fields each have at least two directions due to the presence of the slits, and the multi-domain display may still be achieved. In a case where the positions of the slits in the common electrode layer are set, a region where the black matrix is located covers regions where the slits of the common electrode layer are located, so that the multi-domain display of the display panel may be achieved. The slit in the common electrode layer does not need to directly face the gap between the two adjacent pixel electrodes.

The display device provided by embodiments of the present disclosure includes the display panel provided by the embodiments of the present disclosure.

In summary, in the color filter substrate, the display panel and the display device provided by the embodiments of the present disclosure, since the common electrode layer is provided with the slits, in the case where the color filter substrate provided by the embodiments of the present disclosure is applied to a liquid crystal display panel, after the voltages are applied to the pixel electrodes and the common electrode layer for controlling the liquid crystal molecules to rotate, the electric field that is generated between the pixel electrode and the common electrode layer has at least two directions. Therefore, the rotation directions of the liquid crystal molecules also include at least two directions, and the multi-domain display of the liquid crystal display panel may be achieved. Since the orthographic projections of the slits on the array substrate are within the opaque region, and the slits in two adjacent rows or the slits in two adjacent columns are separated by sub-pixel units, the region in which the liquid crystal molecules are disorderly arranged only corresponds to the opaque region. At a macro level, since the domain lines caused by the disordered arrangement of the liquid crystal molecules appear in the opaque region, the domain lines may be prevented from appearing in the light transmitting region, thereby improving the transmittance of the product and the quality of the image displayed by the product. In the color filter substrate provided by the embodiments of the present disclosure, as for the sub-pixel units in the same row or the sub-pixel units in the same column, the rotation directions of corresponding liquid crystal molecules are consistent. Therefore, the color of the displayed image is uniform, and the quality of the displayed image is further improved. In the color filter substrate provided by the embodiments of the present disclosure, the common electrode layer is still one electrode block, and is not divided into a plurality of separate parts by the slits. Therefore, the arrangement manner of common electrode leads is similar to the conventional arrangement manner of common electrode leads. That is, by using the color filter substrate provided by the embodiments of the present disclosure, the multi-domain display effect may be achieved and the transmittance of the display panel and the quality of the displayed image may be improved synchronously, without changing the arrangement manner of the common electrode leads in the conventional technology. In addition, the manufacturing process of the color filter substrate designed as above is simple and is easy to be implemented. In the color filter substrate shown in FIG. 9 provided by the embodiments of the present disclosure, since the slits are disposed below the black matrix and the black matrix corresponds to the opaque region, the domain lines may be blocked by the black matrix. Therefore, the transmittance of the product and the quality of the displayed image may be improved.

The above descriptions are merely exemplary embodiments employed to explain the principles of the present disclosure, but the present disclosure is not limited thereto. Various modifications and improvements may be made by one person skilled in the art without departing from the spirit and scope of the present disclosure, and such modifications and improvements are also within the scope of the present disclosure.

What is claimed is:

1. A display panel, comprising a color filter substrate, an array substrate disposed opposite to the color filter substrate, and a liquid crystal layer disposed between the color filter substrate and the array substrate, wherein
   the array substrate includes a plurality of pixel electrodes;
   the color filter substrate includes a common electrode layer disposed opposite to the plurality of pixel electrodes and an upper transparent substrate disposed over the common electrode layer;
   in a case where no voltages are applied to the pixel electrodes and the common electrode layer, liquid crystal molecules in the liquid crystal layer are arranged perpendicular to the pixel electrodes;
   the common electrode layer is provided with a plurality of non-continuous slits, orthographic projections of the non-continuous slits on the upper transparent substrate are within an opaque region of the array substrate, and orthographic projections of non-continuous slits in two adjacent rows on the upper transparent substrate are separated by at least two rows of sub-pixel units; or orthographic projections of non-continuous slits in two adjacent columns on the upper transparent substrate are separated by at least two columns of sub-pixel units;
   a slit of the plurality of non-continuous slits is located over a gap between corresponding two adjacent pixel electrodes; and a size of the slit is greater than a size of the gap between the corresponding two adjacent pixel electrodes;
   the orthographic projections of the non-continuous slits on the upper transparent substrate each are in a shape of a rectangle;
   wherein in a case where the orthographic projections of the non-continuous slits in two adjacent rows on the upper transparent substrate are separated by at least two rows of sub-pixel units, a number of non-continuous slits in each row is the same as a number of sub-pixel units in a row, and non-continuous slits in each column are in a same column as sub-pixel units in a corresponding column; a length of a long side of each slit is equal to a width of a corresponding sub-pixel unit in a row direction; an extending direction of a long side of each slit is perpendicular to an extending direction of the sub-pixel units, and in the extending direction of the sub-pixel units, each column of sub-pixel units have a same color;

or wherein in a case where the orthographic projections of the non-continuous slits in two adjacent columns on the upper transparent substrate are separated by at least two columns of sub-pixel units, a number of non-continuous slits in each column is the same as a number of sub-pixel units in a column, and non-continuous slits in each row are in a same row as sub-pixel units in a corresponding row; a length of a long side of each slit is equal to a width of a corresponding sub-pixel unit in a column direction; an extending direction of a long side of each slit is perpendicular to an extending direction of the sub-pixel units, and in the extending direction of the sub-pixel units, each row of sub-pixel units have a same color.

2. The display panel according to claim 1, wherein a long side of each slit is parallel to a side of a corresponding sub-pixel unit in a row direction, or a long side of each slit is parallel to a side of a corresponding sub-pixel unit in a column direction.

3. The display panel according to claim 1, further comprising a planarization layer disposed over the common electrode layer, and a black matrix and a color filter layer disposed over the planarization layer, wherein, the upper transparent substrate is disposed over the black matrix and the color filter layer, the orthographic projections of the non-continuous slits on the upper transparent substrate are within an orthographic projection of the black matrix on the upper transparent substrate.

4. The display panel according to claim 3, wherein the opaque region of the color filter substrate is within the orthographic projections of the black matrix on the upper transparent substrate.

5. A display device, comprising the display panel according to claim 1.

* * * * *